(12) United States Patent
Prendergast et al.

(10) Patent No.: US 12,233,785 B2
(45) Date of Patent: Feb. 25, 2025

(54) METHOD FOR MOUNTING A CAMERA FOR A VEHICLE, PRE-MOUNTING MODULE FOR A CAMERA AS WELL AS CAMERA

(71) Applicant: Connaught Electronics Ltd., Tuam (IE)

(72) Inventors: Blain Prendergast, Tuam (IE); Justyna Bogiel, Tuam (IE); Noel Farrell, Tuam (IE)

(73) Assignee: CONNAUGHT ELECTRONICS Ltd., Tuam (IE)

( * ) Notice: Subject to any disclaimer, the term of this patent is extended or adjusted under 35 U.S.C. 154(b) by 239 days.

(21) Appl. No.: 17/915,714

(22) PCT Filed: Mar. 23, 2021

(86) PCT No.: PCT/EP2021/057365
§ 371 (c)(1),
(2) Date: Sep. 29, 2022

(87) PCT Pub. No.: WO2021/197913
PCT Pub. Date: Oct. 7, 2021

(65) Prior Publication Data
US 2023/0126772 A1  Apr. 27, 2023

(30) Foreign Application Priority Data

Mar. 30, 2020 (DE) ..................... 10 2020 108 771.3

(51) Int. Cl.
*B60R 11/04* (2006.01)
*G03B 30/00* (2021.01)
*H04N 23/51* (2023.01)
(52) U.S. Cl.
CPC .............. *B60R 11/04* (2013.01); *G03B 30/00* (2021.01); *H04N 23/51* (2023.01)

(58) Field of Classification Search
CPC ...................................................... G03B 30/00
See application file for complete search history.

(56) References Cited

U.S. PATENT DOCUMENTS

| 10,250,784 B2 * | 4/2019 | Minikey, Jr. ........... H04N 23/51 |
| 2007/0159703 A1 * | 7/2007 | Apel ................. H01L 27/14625 257/E31.117 |

(Continued)

FOREIGN PATENT DOCUMENTS

| CN | 101435908 A | 5/2009 |
| CN | 105721746 A | 6/2016 |

(Continued)

OTHER PUBLICATIONS

German Search Report in corresponding German Application No. 10 2020 108 771.3, dated Apr. 26, 2021 (6 pages).

(Continued)

*Primary Examiner* — Leon W Rhodes, Jr.
(74) *Attorney, Agent, or Firm* — Osha Bergman Watanabe & Burton LLP

(57) ABSTRACT

A method for mounting a camera for a vehicle providing a first housing part of an electronic housing for the camera, in which a first groove is formed on an outer side of the first housing part, providing a housing outer part separate from the first housing part, which comprises a plug channel and an inner side, wherein a second groove is formed on the inner side, introducing an adhesive part into the first groove and/or into the second groove, assembling and retaining the first housing part to the housing outer part by an adhesive connection, wherein thereto the adhesive part in the first groove adheres to the first housing part and the adhesive part on the second groove adheres to the housing outer part.

10 Claims, 5 Drawing Sheets

(56) References Cited

U.S. PATENT DOCUMENTS

Figure 1:
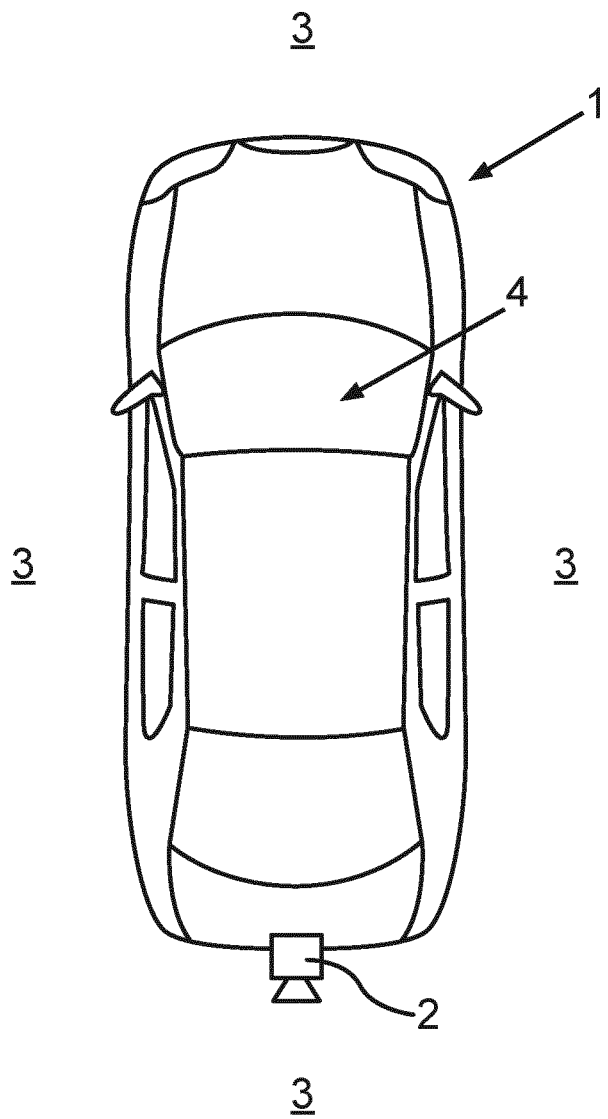

| | | |
|---|---|---|
| 2010/0321497 A1 | 12/2010 | Onishi et al. |
| 2011/0298925 A1 | 12/2011 | Inoue et al. |
| 2012/0154569 A1 | 6/2012 | Geddes |
| 2017/0297504 A1 | 10/2017 | Leonelli, Jr. |
| 2018/0166483 A1 | 6/2018 | Sakamoto et al. |
| 2019/0082082 A1 | 3/2019 | Hashimoto |
| 2019/0387136 A1 | 12/2019 | Ahn et al. |
| 2021/0129959 A1 | 5/2021 | Walpurgis |
| 2021/0231838 A1 | 7/2021 | Okada et al. |

FOREIGN PATENT DOCUMENTS

| | | | |
|---|---|---|---|
| CN | 105911668 A | | 8/2016 |
| CN | 206948467 U | | 1/2018 |
| CN | 207039732 U | | 2/2018 |
| CN | 108353116 A | | 7/2018 |
| CN | 208337718 U | | 1/2019 |
| CN | 208488639 U | | 2/2019 |
| CN | 109552201 A | | 4/2019 |
| CN | 110169048 A | | 8/2019 |
| DE | 102006039654 A1 | | 3/2008 |
| DE | 102018215391 A1 | | 3/2019 |
| JP | 2011109634 A | | 6/2011 |
| JP | 2011259101 A | | 12/2011 |
| JP | 2013503356 A | | 1/2013 |
| JP | 2018006162 A | | 1/2018 |
| JP | 2018098533 A | | 6/2018 |
| JP | 2019134235 A | | 8/2019 |
| JP | 2020016863 A | | 1/2020 |
| KR | 2011071806 A * | 6/2011 | |
| KR | 2013081411 A * | 7/2013 | ........... H04N 5/2252 |
| KR | 20160104316 A | | 9/2016 |
| WO | 2018043172 A1 | | 3/2018 |
| WO | 2018134060 A1 | | 7/2018 |

OTHER PUBLICATIONS

Office Action issued in counterpart Japanese Application No. 2022-559764, dated Nov. 14, 2023 (11 pages).

Office Action issued in counterpart Chinese Application No. 202180030824.1, dated Sep. 27, 2023, with English translation (14 pages).

Office Action issued in counterpart European Application No. 21715203.2, dated Nov. 2, 2023 (7 pages).

Office Action Issued in corresponding Korean Application No. 2022-7037523, dated Apr. 16, 2024. (12 Pages with English Translation).

* cited by examiner

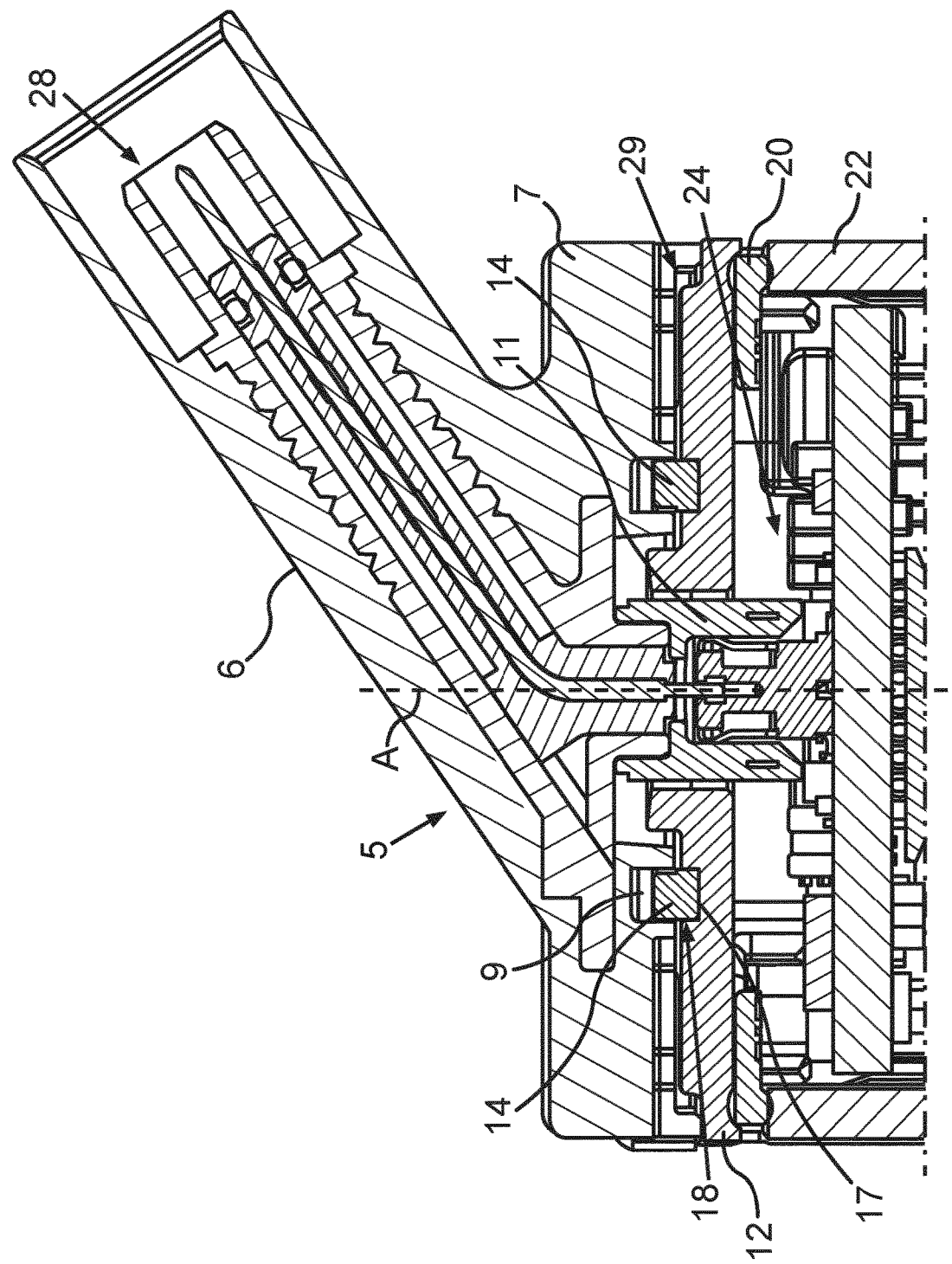

METHOD FOR MOUNTING A CAMERA FOR A VEHICLE, PRE-MOUNTING MODULE FOR A CAMERA AS WELL AS CAMERA

An aspect of the invention relates to a method for mounting a camera for a vehicle. A first housing part of an electronic housing for the camera is provided. In this first housing part, a first groove is formed on an outer side. A housing outer part of the camera separate from the first housing part is provided. This housing outer part comprises a plug channel and an inner side. A second groove is formed on the inner side. A further aspect of the invention relates to a pre-mounting module for a camera. A still further aspect of the invention relates to a camera for a vehicle.

Cameras for vehicles are known in manifold configurations and usually comprise a housing. Electronic components of the camera are arranged in this housing. For example, a circuit board is arranged there, on which a control unit in the form of a microprocessor can be arranged. Moreover, an image sensor is arranged in the electronic housing. A lens assembly is arranged in the housing, by which the incident light can be directed onto the image sensor. It is also known that such a camera comprises a housing outer part separate from the electronic housing. In an advantageous configuration, it can comprise a plug channel. A plug is arranged in this plug channel. A mating plug can be connected to this plug. A line can be connected to the mating plug, by which signals can be passed to the camera and/or be passed away from the camera.

Figure 2:
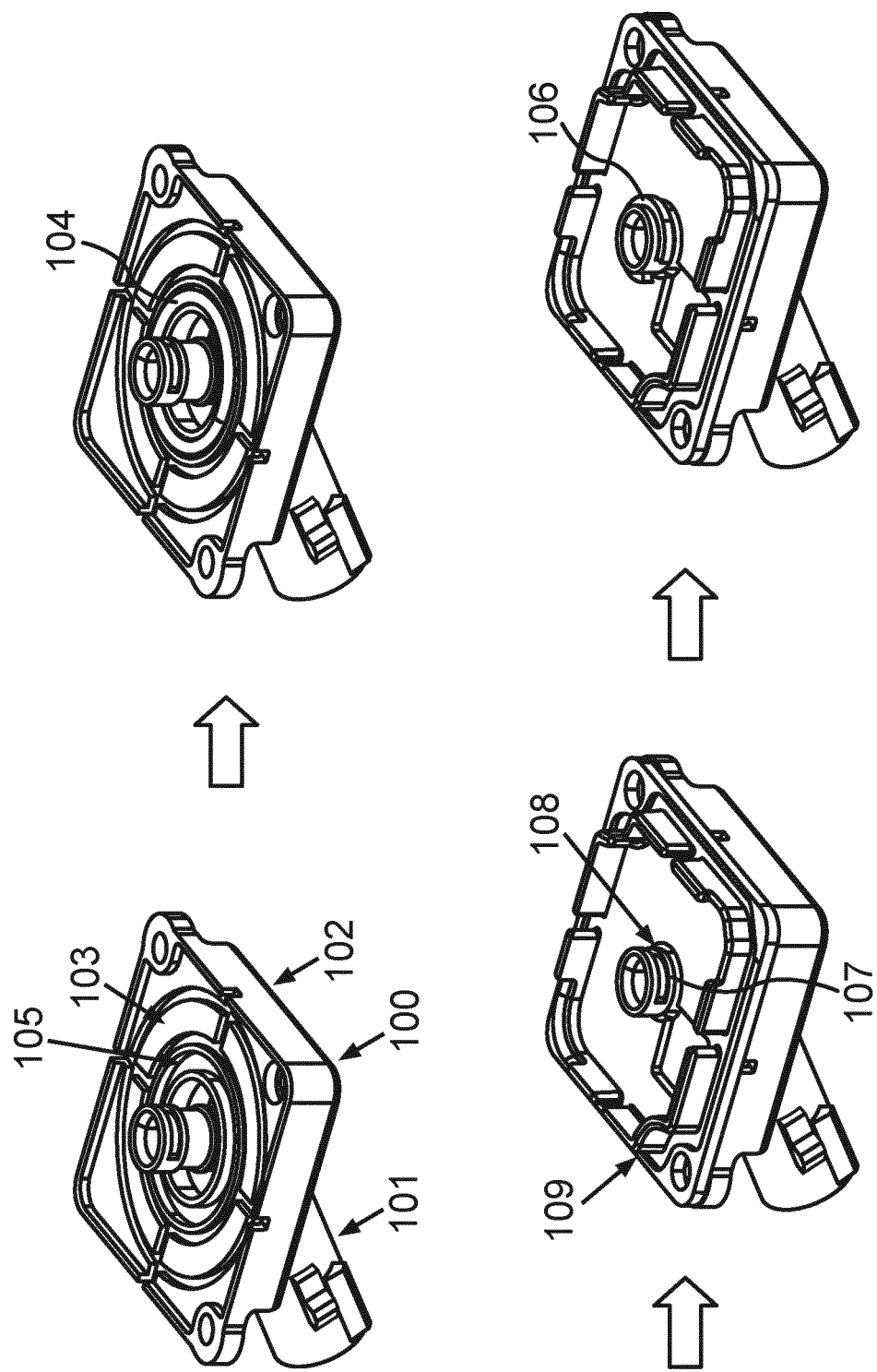

In this context, a housing outer part 100 known from the prior art is disclosed in FIG. 2. It can be formed of plastic. The housing outer part 100 comprises a plug channel 101. A plate-shaped base part 102 of this housing outer part 100 comprises an inner side 103. In FIG. 2, a conventional mounting process of partial components of a camera is also shown. Based on the left image in the upper row in FIG. 2, a seal 104 is introduced into a groove 105 in a following mounting step after providing this housing outer part 100. The groove 105 is formed on the inner side 103. The seal 104 is an O-ring. In a further mounting step according to the representation in FIG. 2, a first housing part 109 of the camera is arranged at the housing outer part 100. It is shown in the lower row, left image, in FIG. 2. The O-ring is then located between the plate-like base part 102 and this plate-shaped first housing part 105. However, this arrangement of the mentioned components does not cohere by itself. Therefore, in the prior art, an additional separate retaining clip 106 is arranged in a further method step as it is shown in the right image in the lower row in FIG. 2. It engages with a groove 107 formed at the plug channel 101. The plug channel 101 extends through a hole 108 in the first housing part 105. By clipping this C-shaped retaining clip 106 in the groove 107, the housing outer part 100 is cohered with the first housing part 105.

Such a mounting scenario is expensive and requires multiple separate parts in this respect.

Therefore, it is the object of the present invention to provide a method, in which the mounting of at least partial components of the camera is improved. Therein, the number of components is in particular to be reduced and the cohesion of a housing outer part of the camera and a first housing part of the camera is to be stably and yet simply configured.

This object is solved by a method, a pre-mounting module and a camera according to the independent claims.

An aspect of the invention relates to a method for mounting a camera for a vehicle. In the method, the following steps are performed:

providing a first housing part of an electronic housing for the camera, in which a first groove is formed on an outer side of the first housing part, providing a housing outer part of the camera separate from the first housing part, which comprises a plug channel and an inner side, wherein a second groove is formed on the inner side.

As further steps, there are performed:

introducing an adhesive part into the first groove and/or into the second groove, assembling and retaining the first housing part to the housing outer part by an adhesive connection, wherein thereto the adhesive part in the first groove adheres to the first housing part and the adhesive part on the second groove adheres to the housing outer part In such a configuration, it is thus possible to individually cohere specific individual components of the camera. This relates to the housing outer part and to the first housing part. Thus, a specifically generated adhesive connection is used in this context to directly cohere these parts with each other. Therefore, it is only required to provide such an adhesive part to allow the autonomous cohesion between the housing outer part and the first housing part. Therein, this one, in particular single, adhesive part forms the retaining and connecting element. By such a configuration, a faster and simpler mounting scenario of these specific partial components can also be achieved.

In an advantageous embodiment, the adhesive part is provided with a pressure-sensitive adhesive. Upon pressing the first housing part to the housing outer part in assembling these components, the conglutination of these components is achieved by the pressure-sensitive adhesive. This is a very advantageous embodiment since pressure-sensitive adhesives of this mounting scenario are particularly advantageous in this context. In this context, the handling of the adhesive part as such is simpler with respect to conventional liquid adhesives. This adhesive part with its pressure-sensitive adhesive is already provided as a prefabricated form part as such. Thus, it has an individual own form stability. Therefore, the provision and manageability are better compared to liquid adhesives, which could generate such an adhesive connection when they are introduced. In this context, the pressure-sensitive adhesive is particularly advantageous. It then particularly advantageously reacts with regard to its adhesive effect when a corresponding pressure is exerted on it. Thereby, it deploys its high adhesive function in particularly advantageous manner if pressure is exerted on this adhesive upon pressing the housing outer part together with the first housing part. Thereby, the adhesive effect of this adhesive is virtually activated upon pressing the mentioned components together required anyway and a particularly advantageous high retaining force is generated.

In an advantageous embodiment, a pre-mounting assembly or a pre-mounting module for the camera is formed by the components adhered together relating to the first housing part, the housing outer part and the adhesive part. Thus, the manufacture of the camera is specifically performed to the effect that these three components are first connected to each other individually considered, in particular in that the first adhesive part, the housing part and the housing outer part are adhered together. This is effected independently of the further components of the camera. Thus, this pre-mounting module is first formed and this pre-mounting module is then provided as such in a further mounting process. This pre-mounting module is then assembled to other components of the camera in the further mounting process. This is a further, very advantageous embodiment. Because specific partial components of the camera can thus first be assembled individually considered. Thereby, the installation with other components of the camera can be effected simpler and more optimized with regard to the mounting process.

Therein, it is possible in an advantageous embodiment that this pre-mounting module is transported to a final mounting site different from the pre-mounting site to perform the mounting of the camera at the final mounting site. Especially thereto, the pre-mounting module is very advantageous. Thus, it is already prefabricated in its associated components an can be transported as a module compact in this respect. Thereby, these specific components of the housing can be assembled at a suitable pre-mounting site provided thereto. In order to be able to provide the then again best possible site for the final mounting, a final mounting site different therefrom is provided. In this context, the individual parts of the pre-mounting module do not have to be brought to the final mounting site, but the already fabricated compact pre-mounting module can be transported there in this context. Thus, only the pre-mounting module is to be mounted with other components of the camera at the final mounting site. Thus, the first housing part, the housing outer part and the adhesive part do not have to be first connected to each other at the final mounting site. This saves time and moreover equipments at the final mounting site, which are required for the pre-mounting process of the pre-mounting module. Thereby, the final mounting site can also be adequately and more optimized configured. Not least, the general manufacture of the camera can thus be better configured with regard to temporal aspects and individually optimized mounting partial steps.

The pre-mounting site can be located in the same building as the final mounting site. However, it can also be provided that the pre-mounting site is in another building or at an another location than the final mounting site.

In an advantageous embodiment, it is provided that the components of the pre-mounting module are cohered only by the adhesive connection before the final mounting. Thereby, particularly efficient attachment of the components to each other yet minimized in components is achieved. In particular, it is thereby also allowed that a secure transport can be effected without the components of the pre-mounting module falling again apart. Moreover, a particularly minimized and yet efficient concept is provided to be able to cohere and transport the pre-mounting module as such.

In an advantageous embodiment, it is provided that the adhesive part is provided as a closed ring. In particular, it is provided as a dimensionally stable, closed ring. Thereby, the adhesive part is relatively robustly and stably constructed in itself. Thus, it can particularly advantageously provide the required retaining force. Even if corresponding forces act on the adhesive part upon assembling the first housing part to the housing outer part, it does not undesirably deform. Thereby, the retaining force for cohering the components can be particularly advantageously established and permanently maintained by the adhesive effect.

Especially by this shaping of the adhesive part, an improved positioning in the grooves can also be achieved. In this context, the grooves are preferably annular grooves.

Preferably, it is provided that the adhesive part is provided with a base part, which is formed with an adhering material on its outer side. This adhering material is in particular a pressure-sensitive adhesive. Thereby, the above mentioned advantages are once again improved.

Preferably, it is provided that the first housing part is provided with an aperture, which is surrounded by the first groove. The housing part is provided with a groove, which is surrounded by the second groove. In the state adhered together, the groove and the aperture are circumferentially surrounded by the adhesive part. This interface is radially sealed by the adhesive part. Thus, the adhesive part surrounds this interface in circumferential direction around the axes of the groove and the aperture. By such a configuration, it is thus also allowed that not only the attachment of the components is achieved, but that an interface of the housing outer part and the first housing part is additionally also sealed by this adhesive part.

In an advantageous embodiment, a second housing part for the electronic housing is provided in finally mounting the camera. The second housing part is arranged such that the first housing part is arranged between the housing outer part and the second housing part. The housing outer part is screwed to the second housing part by at least one screw, in particular multiple screws. Thereby, a particularly stable mechanical connecting state between these three central components of the camera constituting an overall housing is achieved.

In advantageous manner, electronic components such as a control unit or an image sensor are arranged in the interior of the electronic housing. They can be placed on a circuit board arranged in the interior of the electronic housing. In an advantageous implementation, a lens assembly of the camera is also mounted on the electronic housing.

A further aspect of the invention relates to a pre-mounting module for a camera of a vehicle, comprising:
 a first housing part of an electronic housing of the camera, which comprises an outer side with a first groove,
 a housing outer part of the camera separate therefrom, which comprises a plug channel and an inner side, wherein a second groove is formed on the inner side, and
 an adhesive part separate therefrom, wherein the adhesive part is arranged in the first groove in the first housing part and in the second groove in the housing outer part and an adhesive connection is generated by the adhesive part, wherein the first housing part is cohered with the housing outer part only by the adhesive connection.

An aspect of the invention relates to a camera for a motor vehicle, comprising:
 an electronic housing with a first housing part, wherein a first groove is formed on an outer side of the first housing part, and with a second housing part separate from the first housing part, wherein the electronic housing is closed by the first housing part and the second housing part,
 a housing outer part separate from the electronic housing, which comprises a plug channel and an inner side, wherein a second groove is formed on the inner side, wherein
 the first housing part is arranged between the second housing part and the housing outer part, and
 a separate adhesive part, wherein the adhesive part is arranged in the first groove in the first housing part and in the second groove in the housing outer part and an adhesive connection is generated by the adhesive part, wherein the first housing part is cohered with the housing outer part by the adhesive connection, and with in particular
 electronic components in the electronic housing and with in particular
 at least one screw, by which the housing outer part is screwed to the electronic housing.

Further features of the invention are apparent from the claims, the figures and the description of figures. The features and feature combinations mentioned above in the description as well as the features and feature combinations mentioned below in the description of figures and/or shown in the figures alone are usable not only in the respectively specified combination, but also in other combinations or alone without departing from the scope of the invention. Thus, implementations are also to be considered as encompassed and disclosed by the invention, which are not explicitly shown in the figures and explained, but arise from and can be generated by separated feature combinations from the explained implementations. Implementations and feature combinations are also to be considered as disclosed, which thus do not comprise all of the features of an originally formulated independent claim.

Below, embodiments of the invention are explained in more detail based on schematic drawings.

Figure 3:
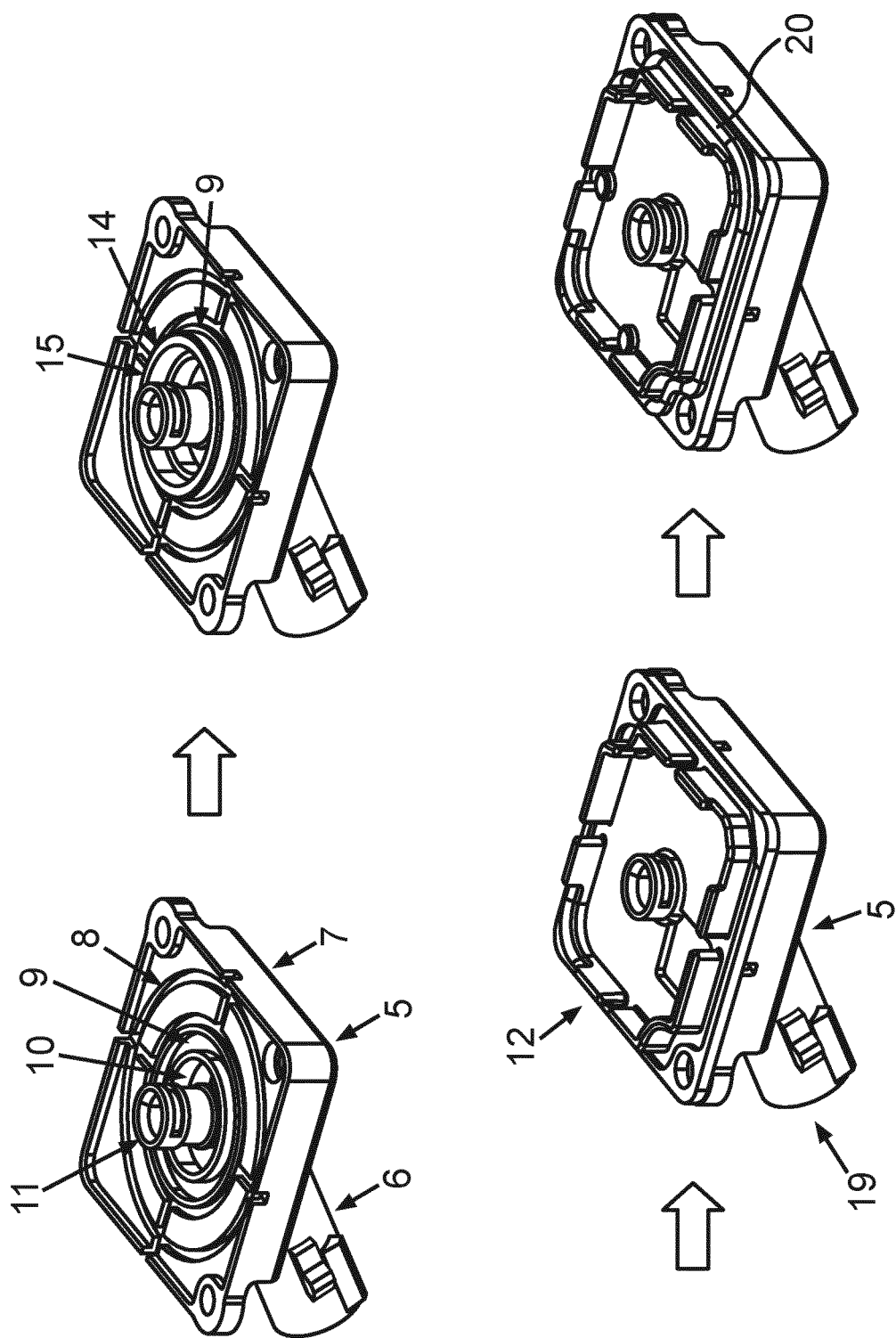
Figure 4:
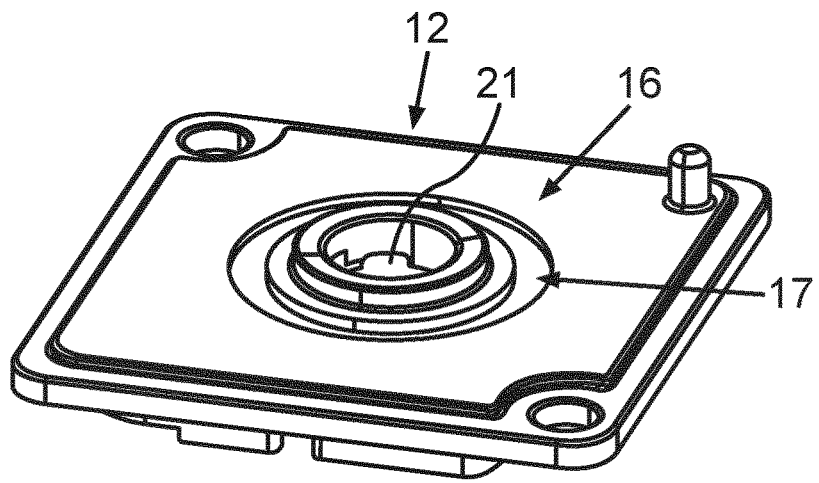
Figure 5:
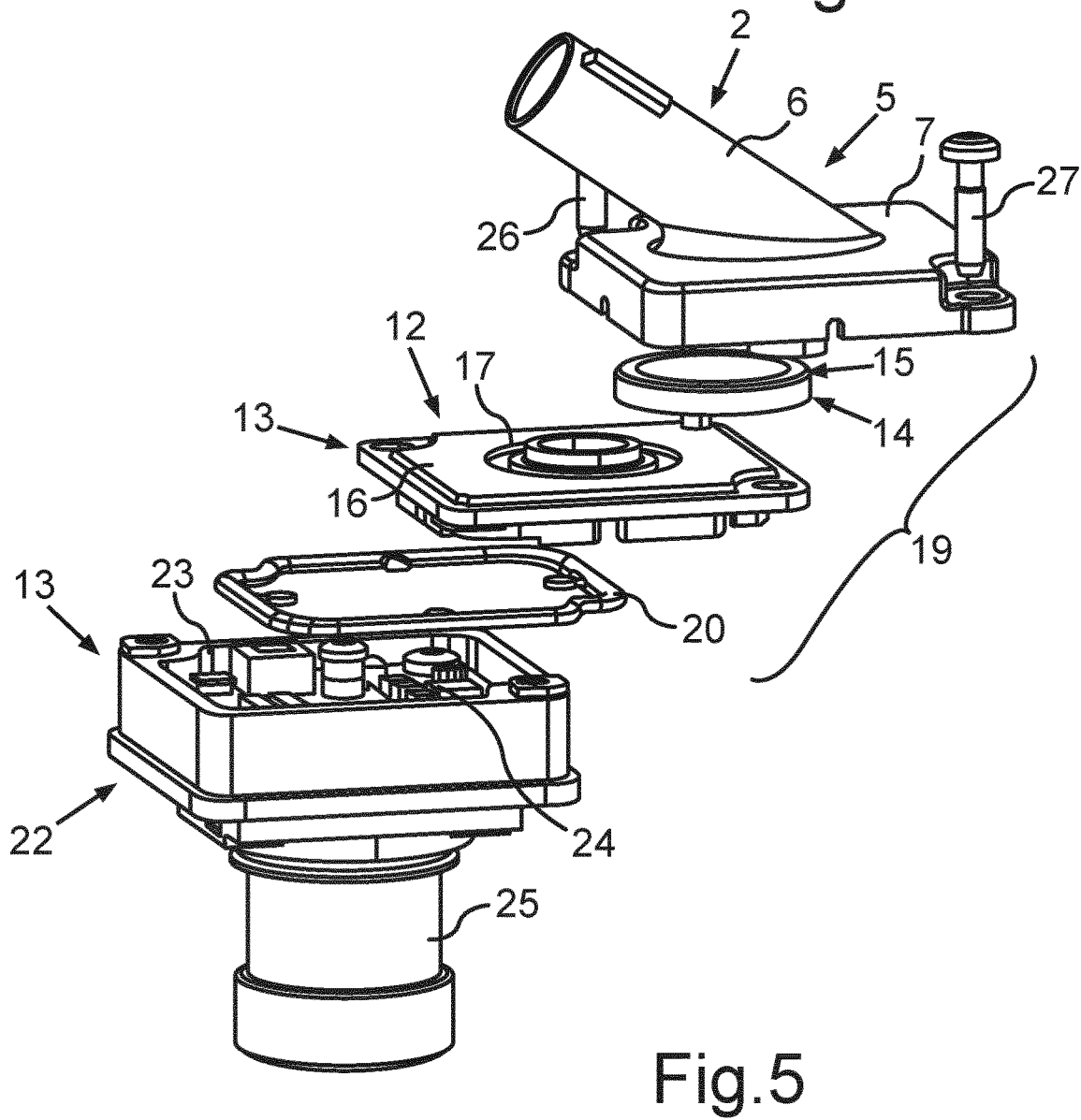

There show:

FIG. 1 an embodiment of a motor vehicle according to the invention with a camera in schematic top view;

FIG. 2 a mounting of a housing outer part with a first housing part of a camera known from prior art;

FIG. 3 a mounting scenario between a housing outer part and a first housing part according to an embodiment of a pre-mounting module according to the invention of an embodiment of a camera according to the invention;

FIG. 4 a perspective representation of a first housing outer part of the camera;

FIG. 5 an exploded representation of an embodiment of a camera according to the invention; and FIG. 6 a vertical sectional representation through partial components of the assembled camera according to FIG. 5.

In FIG. 1, a top view to a motor vehicle 1 with a camera 2 according to an embodiment of the invention is schematically illustrated. The arrangement of the camera 2 on the motor vehicle 1 is arbitrary, however preferably such that an environmental region 3 of the motor vehicle 1 and/or an interior region 4 of the motor vehicle 1 can be captured. The motor vehicle 1 can also include multiple such cameras 2. The camera 2 can be a CMOS (Complementary Metal-Oxide-Semiconductor) camera or else a CCD (Charge-Coupled Device) camera or any image capturing device.

The camera 2 can for example also be arranged in the front region of the motor vehicle 1 and be oriented to the front such that the front environmental region of the motor vehicle 1 is captured. In addition or instead, a camera can for example also be arranged in a second region of the motor vehicle 1, for example at a wing mirror. For example, a camera 2 can also be arranged such that it captures an interior of the motor vehicle 1 at least in certain areas.

In FIG. 3, a mounting scenario of partial components of the camera 2 is shown. It is provided that a housing outer part 5 of the camera 2 is first provided. This housing outer part 5 can be formed of plastic. The housing outer part 5 comprises a plug channel 6. Moreover, it comprises a plate-like base part 7. The plate-like base part 7 comprises an inner side 8. A second groove 9 is formed on the inner side 8. It can be provided that this housing outer part 5 comprises an aperture 10. A partial piece 11 of the plug channel 6 extends through this aperture 10. The aperture 10 can be continuous or for example also be a groove.

Moreover, a first housing part 12 (FIG. 4) separate from the housing outer part 5 is provided. The first housing part 12 is plate-like formed. It is preferably integrally formed. The first housing part 12 is a constituent of an electronic housing 13 (FIG. 5) of the camera 2.

In the mounting steps explained in FIG. 3, an adhesive part 14 is inserted into this second groove 9 after providing the housing outer part 5 and the first housing part 12. The adhesive part 14 is separate from the housing outer part 5 and from the first housing part 12. In particular, the adhesive part 12 is a dimensionally stable ring closed in itself. The adhesive part 14 comprises a pressure-sensitive adhesive 15 at least in certain areas. If this adhesive part 14 is inserted in the second groove 9 according to the second image in the first line in FIG. 3, thus, the first housing part 12 is subsequently fitted according to the representation in the image 3 in the first row in FIG. 3. An outer side 16 (FIG. 4) of the first housing part 12 comprises a first groove 17. By fitting this plate-like first housing part 12 to the housing outer part 5, the adhesive part 14 is also introduced into this first groove 17. In that the first housing part 12 and the housing outer part 5 are assembled and a certain pressure is thereby exerted, an adhesive connection 18 (FIG. 6) is generated. By this adhesive connection 18, the first housing part 12 and the housing outer part 5 are adhered to each other by the adhesive part 14. Thus, assembling and retaining the first housing part 12 to the housing outer part 5 are effected by this adhesive connection 18. Thereto, the adhesive part 14 adheres in the first groove 17 on the first housing part 12 and adheres to the second groove 9 on the housing outer part 5. Especially by the pressure-sensitive adhesive 15, a certain pressure is formed on the adhesive part 14 in assembling and thereby the particularly advantageous adhesive effect of this adhesive part 14 is allowed. If this mounting state is achieved, as it is illustrated in the lower line, left image in FIG. 3, a pre-mounting module 19 for the camera 2 is produced. The pre-mounting module 19 can be additionally provided with a seal 20, as it is shown in the following fourth image in FIG. 3, in an advantageous implementation. Then, this pre-mounting module 19 is provided for the further final mounting procedure of the camera 2.

In particular, it is provided that the housing outer part 5 and the first housing part 12 are only cohered by this adhesive connection 18, which is generated by the adhesive part 14, in this pre-mounting module 19.

In particular, it is provided that this pre-mounting process until the pre-mounting module 19 is produced, is effected at a pre-mounting site. In particular, this pre-mounting module 19 is then transported from the pre-mounting site to a final mounting site. The camera 2 is then finally mounted at the final mounting site.

According to the representation in FIG. 4, it is also apparent that this first housing part 12 comprises an aperture 21. Here, the aperture 21 is formed as a continuous hole, which is in particular centrally arranged in the middle. This first groove 17 surrounds this aperture 21.

As is moreover also apparent in FIG. 3, the second groove 9 surrounds the aperture 10. In the assembled state of the housing outer part 5 to the first housing part 12 according to the pre-mounting module 19, the adhesive part 14 thus then also surrounds apertures 21 and 10. Thereby, this interface is also sealed by the adhesive part 14 in an advantageous implementation. In particular, a radial seal is provided by this surrounding configuration of the adhesive part 14.

In the exploded representation in FIG. 5, the camera 2 is illustrated with its individual parts. In addition to the already mentioned components, the camera 2 also comprises a second housing part 22. The electronic housing 13 is formed by the first housing part 12 and the second housing part 22. Electronic components are arranged in an interior 23 of the electronic housing 13. They are generally provided with the reference character 24 in the representation according to FIG. 5.

Moreover, the camera 2 comprises a lens assembly 25. It is arranged at the second housing part 22. The components shown in FIG. 5 relate to the pre-mounting module 19 and are then finally mounted with the remaining mentioned components of the camera 2 in the final mounting procedure. Thereto, screws 26 and 27 are then also provided in an advantageous implementation. These at least two screws 26 and 27 in the embodiment are provided to screw the overall housing to each other. The overall housing is formed by the electronic housing 13 and the housing outer part 5.

In FIG. 6, a vertical sectional representation through the camera 2 in the assembled state is shown. A plug 28 arranged in a plug channel 6 is apparent. The screws 26 and 27 are passed through holes in the base part 7, furthermore passed through holes in the first housing part 12 and screwed in screw mandrels in the second housing part 22.

As is apparent in FIG. 6, the first housing part 12 is arranged between the housing outer part 5 and the second housing part 22. It is also achieved by the pre-mounting module 19 that the housing outer part 5 and the first housing part 12 are movable relative to each other to certain extent in axial direction with respect to the longitudinal axis A of the camera 2. Thereby, tolerances can also be compensated for. In particular, in screwing the mentioned components, it is thereby also allowed that the housing outer part 5 and the housing outer part 12 can also positionally align with each other. In this context, they can also move relative towards each other in axial direction since a gap 29 is formed between the base part 7 and the first housing part 12 in the pre-mounting module 19. It can also still be present in the finally mounted state of the camera 2 according to the representation in FIG. 6, optionally be reduced with respect to the configuration in the pre-mounting module 19.

The invention claimed is:

1. A method for mounting a camera for a vehicle, comprising:
    providing a first housing part of an electronic housing for the camera, in which a first groove is formed on an outer side of the first housing part;
    providing a housing outer part separate from the first housing part, which comprises a plug channel and an inner side, wherein a second groove is formed on the inner side;
    introducing an adhesive part into the first groove and/or into the second groove; and
    assembling and retaining the first housing part to the housing outer part by an adhesive connection, wherein thereto the adhesive part in the first groove adheres to the first housing part and the adhesive part on the second groove adheres to the housing outer part,
    wherein the adhesive part is provided as a dimensionally stable, closed ring.

2. The method according to claim 1, wherein the adhesive part is provided with a pressure-sensitive adhesive, wherein upon pressing the first housing part to the housing outer part upon assembling, adhering the components together is effected by the pressure-sensitive adhesive.

3. The method according to claim 1, wherein pre-mounting module for the camera is formed by the adhered components relating to the first housing part, the housing outer part and the adhesive part.

4. The method according to claim 3, wherein the pre-mounting module is transported to a final mounting site different from the pre-mounting site for finally mounting the camera.

5. The method according to claim 4, wherein components of the pre-mounting module are cohered only by the adhesive connection before the final mounting.

6. The method according to claim 1, wherein the adhesive part is provided with a base part, which is formed with an adhering material on its outer side.

7. The method according to claim 1, wherein the first housing part is provided with an aperture, which is surrounded by the first groove, and the housing outer part is provided with an aperture, which is surrounded by the second groove, wherein the apertures and the first and second grooves are circumferentially surrounded by the adhesive part in the state adhered together and the apertures and the first and second grooves are radially sealed by the adhesive part.

8. The method according to claim 1, wherein in finally mounting the camera, a second housing part for the electronic housing is provided and the second housing part is arranged such that the first housing part is arranged between the housing outer part and the second housing part, wherein the housing outer part is then screwed to the second housing part by at least one screw.

9. A pre-mounting module for a camera of a vehicle comprising:
    a first housing part of an electronic housing of the camera, which comprises an outer side with a first groove,
    a housing outer part of the camera separate therefrom, which comprises a plug channel and an inner side, wherein a second groove is formed on the inner side; and
    an adhesive part separate therefrom, wherein the adhesive part is arranged in the first groove in the first housing part and in the second groove in the housing outer part and an adhesive connection is generated by the adhesive part, wherein the first housing part is cohered with the housing outer part only by the adhesive connection,
    wherein the adhesive part is provided as a dimensionally stable, closed ring.

10. A camera for a motor vehicle, comprising:
    an electronic housing with a first housing part, wherein a first groove is formed on an outer side of the first housing part, and with a second housing part separate from the first housing part, wherein the electronic housing is closed by the first housing part and the second housing part;
    a housing outer part separate from the electronic housing, which comprises a plug channel and an inner side, wherein a second groove is formed on the inner side,
    wherein the first housing part is arranged between the second housing part and the housing outer part; and
    a separate adhesive part, wherein the adhesive part is arranged in the first groove in the first housing part and in the second groove in the housing outer part and an adhesive connection is generated by the adhesive part, wherein the first housing part is cohered with the housing outer part by the adhesive connection, and with electronic components in the electronic housing and with at least one screw, by which the housing outer part is screwed to the electronic housing,
    wherein the adhesive part is provided as a dimensionally stable, closed ring.

* * * * *